(12) United States Patent
Tanaka et al.

(10) Patent No.: US 7,194,160 B2
(45) Date of Patent: Mar. 20, 2007

(54) FILTER MODULE

(75) Inventors: Hiroyuki Tanaka, Osaka (JP); Akimitsu Sato, Osaka (JP); Takeshi Ishimaru, Osaka (JP); Takashi Fukuzawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 61 days.

(21) Appl. No.: 10/366,998

(22) Filed: Feb. 14, 2003

(65) Prior Publication Data

US 2003/0152327 A1    Aug. 14, 2003

(30) Foreign Application Priority Data

Feb. 14, 2002    (JP) .............................. 2002-037138

(51) Int. Cl.
*G02B 6/32* (2006.01)
*G02B 6/26* (2006.01)
*G02B 6/42* (2006.01)

(52) U.S. Cl. .............................. 385/33; 385/31; 385/34; 385/39; 385/50

(58) Field of Classification Search .................. 385/24, 385/78, 31, 33–39, 46–52, 55, 58–61, 66–68, 385/70–74
See application file for complete search history.

(56) References Cited

U.S. PATENT DOCUMENTS

| | | | |
|---|---|---|---|
| 5,453,827 A | | 9/1995 | Lee .............................. 356/73.1 |
| 5,555,330 A * | | 9/1996 | Pan et al. ....................... 385/39 |
| 5,642,447 A * | | 6/1997 | Pan et al. ....................... 385/31 |
| 5,642,448 A * | | 6/1997 | Pan et al. ....................... 385/31 |
| 5,652,814 A * | | 7/1997 | Pan et al. ....................... 385/24 |
| 5,682,452 A * | | 10/1997 | Takahashi ...................... 385/85 |
| 5,889,904 A * | | 3/1999 | Pan et al. ....................... 385/24 |
| 5,917,626 A * | | 6/1999 | Lee ............................... 398/88 |
| 6,023,542 A * | | 2/2000 | Pan et al. ....................... 385/24 |
| 6,040,944 A * | | 3/2000 | Pan et al. ..................... 359/590 |
| 6,168,319 B1 * | | 1/2001 | Francis ......................... 385/79 |
| 6,185,347 B1 * | | 2/2001 | Zheng ........................... 385/34 |
| 6,192,175 B1 | | 2/2001 | Li et al. ........................ 385/27 |
| 6,198,858 B1 * | | 3/2001 | Pan et al. ....................... 385/24 |
| 6,282,339 B1 * | | 8/2001 | Zheng ........................... 385/34 |
| 6,343,166 B1 * | | 1/2002 | Hellman et al. ............... 385/31 |
| 6,396,980 B1 * | | 5/2002 | Liu et al. ....................... 385/34 |
| 6,400,867 B1 * | | 6/2002 | Liu ............................... 385/33 |
| 6,454,465 B1 * | | 9/2002 | Uschitsky et al. ............ 385/79 |

(Continued)

FOREIGN PATENT DOCUMENTS

JP    53-105254    9/1978

(Continued)

*Primary Examiner*—Frank G. Font
*Assistant Examiner*—Ryan Lepisto
(74) *Attorney, Agent, or Firm*—Fish & Richardson P.C.

(57) ABSTRACT

A filter module includes a first optical fiber collimator, a second optical fiber collimator, and a filter located between the first and second optical fiber collimators. The first optical fiber collimator includes a first optical fiber, a first optical fiber chip for holding the first optical fiber, and a first lens. The second optical fiber collimator includes second optical fibers, a second optical fiber chip for holding the second optical fiber, and a second lens. The filter is located between and coaxial with the first and second lenses. The filter, the first lens, and the second lens form a center piece of the filter module.

14 Claims, 9 Drawing Sheets

U.S. PATENT DOCUMENTS

| | | |
|---|---|---|
| 6,701,040 B2 * | 3/2004 | Li et al. .................. 385/34 |
| 6,735,360 B2 * | 5/2004 | Mao et al. ................ 385/33 |
| 2002/0081066 A1 * | 6/2002 | Brun et al. ............... 385/34 |
| 2002/0085807 A1 * | 7/2002 | Xiaofan .................... 385/33 |

FOREIGN PATENT DOCUMENTS

| | | |
|---|---|---|
| JP | 57-70205 | 10/1980 |
| JP | 59-176011 | 11/1984 |
| JP | 60-46509 | 4/1985 |
| JP | 60-121405 | 6/1985 |
| JP | 61-75309 | 4/1986 |
| JP | 62-270901 | 11/1987 |
| JP | 63-96505 | 6/1988 |
| JP | 2-64508 | 3/1990 |
| JP | 5-11150 | 1/1993 |
| JP | 08-254638 | 10/1996 |
| JP | 8-292342 | 11/1996 |
| JP | 9-90247 | 4/1997 |
| JP | 9-211348 | 8/1997 |
| JP | 2000-19358 | 1/2000 |
| JP | 2000-90573 | 3/2000 |
| JP | 2000-304978 | 11/2000 |
| JP | 2001-296446 | 10/2001 |
| JP | 2003-240960 * | 8/2003 |
| WO | WO 00/03277 | 1/2000 |
| WO | WO 01/75494 A2 | 10/2001 |

* cited by examiner (a)

(b)

(a)

(b)

(c)

(a)

(b)

(c)

FILTER MODULE

CROSS REFERENCE TO RELATED APPLICATIONS

Pursuant to 35 USC § 119, this application claims the benefit of Japan Patent Application No. 2002-037138 filed Feb. 14, 2002.

BACKGROUND OF THE INVENTION

The present invention relates to a filter module such as multiplexer/demultiplexer module, used in an optical communication system of the dense wavelength division multiplexing (DWDM).

A typical optical communication system uses multiplexer modules and demultiplexer modules. A multiplexer module multiplexes (couples) two or more optical signals having different wavelengths and outputs the multiplexed signals to a single optical fiber. A demultiplexer module demultiplexes (divides) the wavelength-division-multiplex signals transmitted by optical fibers into separate signals.

FIG. 14 shows a prior art filter module used as modules discussed above. The filter module includes a single core optical fiber collimator (single fiber collimator) 21, a dual core optical fiber collimator (dual fiber collimator) 22, a cylindrical tube 23 for integrally holding the optical fiber collimators 21, 22. A filter 24 is joined to the end of the single fiber collimator 21 with adhesive. The filter 24 has wavelength selective property.

The single fiber collimator 21 includes a single core capillary 26, a gradient index rod lens 27, and a tube 28. The single core capillary 26 holds a single optical fiber 25. The tube 28 holds the single core capillary 26 and the rod lens 27. Referring to FIG. 14, the radiating end of the optical fiber 25 and the right end of the single core capillary 26 are ground to form a slant surface. An end of the rod lens 27 that faces the slant surface is also ground to form a slant surface. The single core capillary 26 and the rod lens 27 are aligned to match the axes and to accommodate angle difference, and then are fixed with adhesive in the tube 28 to maintain the aligned positions.

The dual fiber collimator 22 includes a double core capillary 32, a gradient index rod lens 33, and a tube 34. The double core capillary 32 holds two optical fibers 30, 31. The tube 34 integrally holds the double core capillary 32 and the rod lens 33. The facing ends of the double core capillary 32 and the rod lens 33 are ground to form slant surfaces. The double core capillary 32 and the rod lens 33 are adjusted to align the axes and accommodate angle difference. Thereafter, adhesive 35 is annularly applied to and placed between the slant surfaces to maintain the adjusted positions. The adhesive 35 acts to attach the double core capillary 32 and the rod 33 to each other. The joint is covered with a reinforcing adhesive 36. A short tube 37 is fitted about the right end of the double core capillary 32. The tube 34 is locate about the tube 37, the double core capillary 32, and the rod lens 33. Adhesive 38 fills the space that is inside the tube 34 and surrounds the double core capillary 32 and the rod lens 33. Accordingly, the double core capillary 32 and the rod lens 33 are held in the tube 34.

After forming the two optical fiber collimators 21, 22, the filter 24 is joined to the front end of the single fiber collimator 21, or the right end of the rod lens 27 with adhesive. Also, an optical device 39, such as a filter, is joined to the left end of the rod lens 33 with adhesive.

Thereafter, the two optical fiber collimators 21, 22 are aligned to match the axes and to accommodate angle difference and are joined to each other with adhesive 40 in the tube 23 so that the aligned positions are maintained. The filter module of FIG. 14 is thus manufactured.

However, since the above described prior art filter module has a great number of components, there are too many aligning and fixing procedures. This increases the time for manufacturing the filter module and lowers the reliability. Also, the manufacturing costs are increased.

SUMMARY OF THE INVENTION

Accordingly, it is an objective of the present invention to provide a simple and inexpensive filter module that is reliable and easy to manufacture.

To achieve the foregoing and other objectives and in accordance with the purpose of the present invention, a filter module including a first optical fiber collimator, a second optical fiber collimator, and a filter located between the first and second optical fiber collimators is provided. The first optical fiber collimator includes a first optical fiber, a first optical fiber chip for holding the first optical fiber, and a first lens. The second optical fiber collimator includes a second optical fiber, a second optical fiber chip for holding the second optical fiber, and a second lens. The filter is located between and coaxial with the first and second lenses. The filter, the first lens, and the second lens form a center piece of the filter module.

The present invention provides another filter module including a first optical fiber collimator, a second optical fiber collimator, and a filter located between the first and second optical fiber collimators. The first optical fiber collimator includes a first optical fiber, a first optical fiber chip for holding the first optical fiber, and a first rod lens. The second optical fiber collimator includes a second optical fiber, a second optical fiber chip for holding the second optical fiber, and a second rod lens. The filter is located between and coaxial with the first and second rod lenses and is fixed to the second rod lens. The filter, the first rod lens, and the second rod lens form a center piece of the filter module. The first and second rod lenses each have an optical axis and a slant end, the slant end being inclined relative to the optical axis by a predetermined angle. Each of the first and second rod lenses is provided with a mark used for matching the phases of the slant ends. The first optical fiber comprises a single optical fiber. The second optical fiber comprises two optical fibers.

The present invention also provides a method for manufacturing a filter module. The method includes: inserting a first rod lens to a first lens holder and fixing the first rod lens to the first lens holder with adhesive; inserting a second rod lens to a second lens holder and fixing the second rod lens to the second lens holder with adhesive; fitting the first lens holder to the second lens holder, and matching the phases of slant ends of the first and second rod lenses by rotating the first and second lens holders relative to each other about the axes; adjusting the distance between the first and second rod lenses; completing a center piece by fixing the first and second lens holders to each other; and adjusting the positions of optical fiber chips relative to the center piece and fixing the optical fiber chips to the center piece.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Filter modules according to the embodiments of the present invention will now be described with reference to the drawings. The filter modules of the following embodiments are used as multiplexer/demultiplexer modules in optical communication systems of wavelength-division multiplexing (WDM) or dense wavelength-division multiplexing (DWDM). Throughout the description, the same or like components have the same reference numbers in all embodiments.

Figure 1:
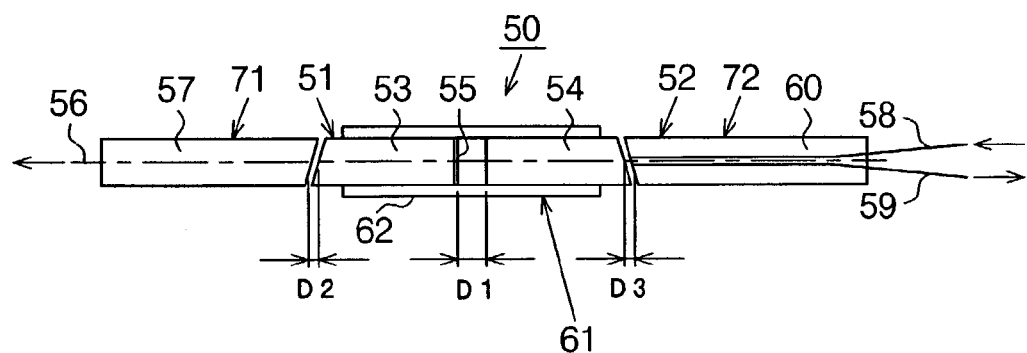
FIG. 1 is a cross-sectional view illustrating a filter module according to a first embodiment.

FIG. 1 illustrates a filter module 50 according to a first embodiment. Hatching is omitted in FIG. 1. The filter module 50 is a multiplexer/demultiplexer module having first and second optical fiber collimators 51, 52 and a filter. The collimators 51, 52 have a lens 53, 54, respectively, and the filter, which is a waveguide selective reflection film 55, is located between the lenses 53, 54. The lenses 53, 54 are gradient index rod lenses (hereinafter referred to as rod lenses).

The first optical fiber collimator 51 is a single core optical fiber collimator (herein after referred to as single core optical fiber collimator) that includes a single core capillary 57 and the rod lens 53. The single core capillary 57 holds a single mode optical fiber 56 (herein after referred to as optical fiber). The optical fiber 56 and the single core capillary 57 form a single core optical fiber chip 71.

The second optical fiber collimator 52 is a dual fiber collimator that has a double core capillary 60 and the rod lens 54. The double core capillary 60 holds two optical fibers 58, 59. The optical fibers 58, 59 and the double core capillary 60 form a double core optical fiber chip 72. In this specification, "optical fiber chip" refers to a device formed by fixing the distal end of an optical fiber to a capillary, such as the single core optical fiber chip 71 and the double core optical fiber chip 72.

The filter module 50 has a center piece 61, in which the first and second rod lenses 53, 54 of the optical fiber collimators 51, 52 are coaxially arranged and integrated. A "center piece" refers to a member that is used in an optical module having a pair of collimators and optical parts between the collimators. A "center piece" holds the optical axes of facing lenses and the optical components such that the optical axes are aligned. In this embodiment, the pair of collimators are the optical fiber collimators 51, 52, the facing lenses are the rod lenses 53, 54, and the optical component is the wavelength selective reflection film 55. The filter module 50 is formed by aligning and fixing the single core optical fiber chip 71 and the double core optical fiber chip 72.

The right end of the rod lens 53 is ground to be perpendicular to the optical axis. The left end of the rod lens 53 is ground to be slant relative to a plane that is perpendicular to the optical axis by a predetermined angle (for example, eight degrees). The rod lens 54 is identical to the rod lens 53.

The diameter of the first and second rod lenses 53, 54 is, for example, 1.8 mm, and the pitch of the lenses 53, 54 is, for example, 0.245. Pitch refers to a meandering cycle of light in a rod lens. In this embodiment, one pitch of the rod lenses is 19.6 mm. Therefore, the length of a rod lens having a pitch of 0.245 is 4.8 mm.

A reflection film 55 is formed on the right end of the rod lens 53. The reflection film 55 is a dielectric film having a wavelength selective property. The reflection film 55 is an edge filter that passes all the light of wavelengths in the vicinity of 1.55 μm, which are typically used in the field of optical communications (for example, 1.53–1.58 μm, wavelength range λ1). The reflection film 55 reflects all the light of wavelengths in the vicinity of 1.48 μm (for example, 1.45–1.49 μm, wavelength range λ2). The reflection film 55 acts as a filter (band-pass filter) that only passes (or reflects) wavelengths in a range from several nm to several tens of nm, which are used in the field of optical communications. An antireflective film is formed on each of the slant end surface (left end) of the rod lens 53, and on the end surfaces of the rod lens 54, respectively.

The wavelength selective reflection film 55 may be formed on either one of the facing surfaces of the first and second rod lenses 53, 54 without significantly affecting the performance. However, if the pitch of the first and second rod lenses 53, 54 is equal to or less than 0.245, it is more reasonable and preferable to form the film 55 on one end of the rod lens 53 of the single core optical fiber collimator 51.

The right end of the optical fiber 56 and the right end of the single core capillary 57 are ground to be flush and slant relative to a plane that is perpendicular to the core axis of the optical fiber 56 (for example, by eight degrees). ??? The single core optical fiber chip 71 is aligned with and fixed to the center piece 61 such that the slant end of the single core capillary 57 and the inclined end of the rod lens 53 face each other. In the same manner, the double core optical fiber chip 72 is aligned with and fixed to the center piece 61 such that the slant end of the double core capillary 60 and the slant end of the rod lens 54 face each other.

The integrated center piece 61 is formed by inserting the first and second rod lenses 53, 54 into the cylindrical lens holder 62 and fixing the first and second rod lenses 53, 54 with adhesive. At this time, the distance D1 between the lenses 53, 54 is adjusted to be a predetermined value. The inner circumference of the lens holder 62 is accurately machined to coaxially hold the first and second rod lenses 53, 54. Therefore, the axes of the first and second rod lenses 53, 54 are aligned simply by inserting the first and second rod lenses into the lens holder 62. To facilitate adjusting of the positions of the first and second rod lenses 53, 54 in the lens holder 62 so that the lens distance D1 is adjusted to be the predetermined value, indications, such as marks, are preferably provided on the rod lenses 53, 54 and on the lens holder 62.

When the optical fiber chips 71, 72 are aligned with respect to and fixed to the center piece 61, the center piece 61 and the optical fiber chips 71, 72 are simultaneously aligned. The center piece 61 and the optical fiber chips 71, 72, which are aligned and integrated, form the filter module 50. The double core optical fiber chip 72 is preferably aligned with respect to and fixed to the center piece 61 prior to aligning and fixing of the single core optical fiber chip 71.

The alignment of the single core optical fiber chip 71 is carried out in the following manner. The optical axis of the rod lens 53 and the optical axis of the optical fiber 56 are aligned. The angle difference of the axes are adjusted. Also, the distance D2 between the rod lens 53 and the optical fiber 56 is adjusted.

Figure 13:
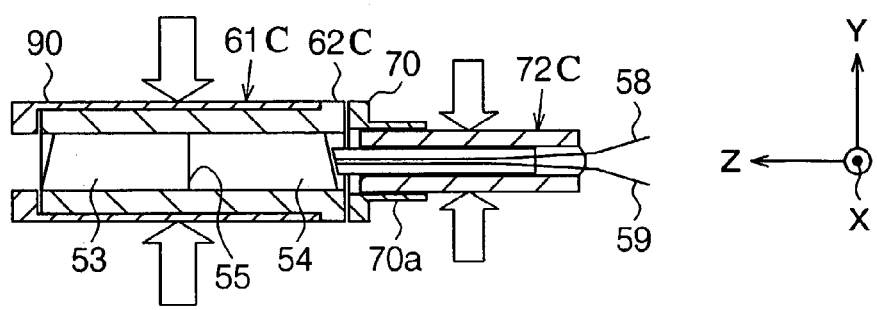
FIGS. 13(a) to 13(d) are diagrams showing steps subsequent to the steps of FIGS. 12(a) and 12(b)
Figure 13:
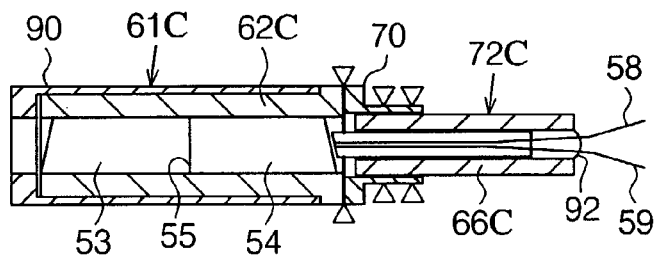
Figure 13:
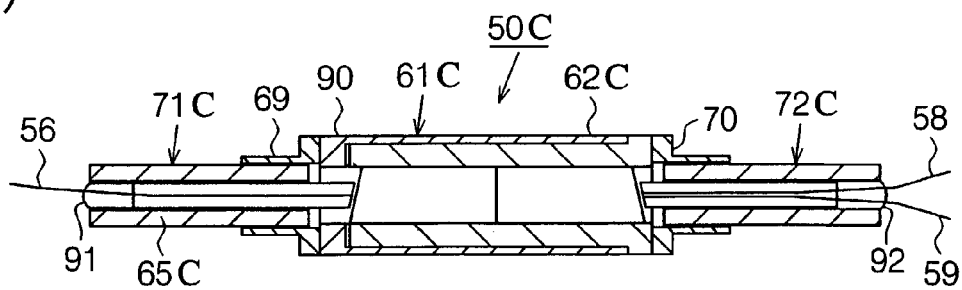
Figure 13:
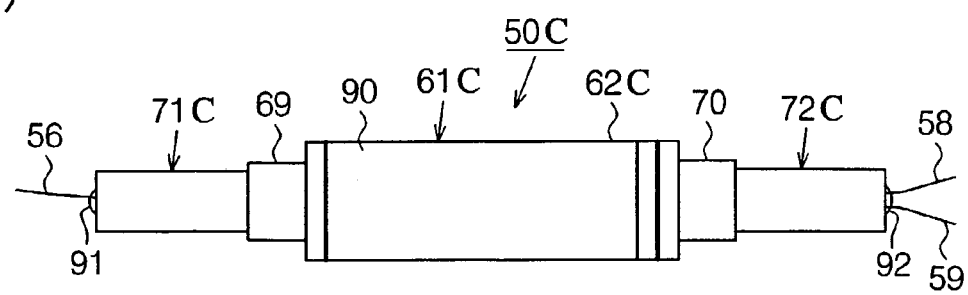
Figure 14:
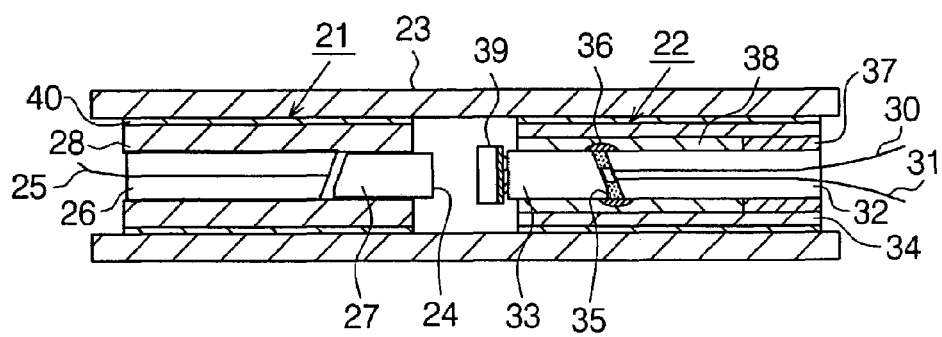
FIG. 14 is a cross-sectional view illustrating a prior art filter module.

That is, the relative positions of the optical axis of the rod lens 53 and the end of the optical fiber 56 are three dimensionally adjusted along X, Y, and Z directions (see FIG. 13(*a*)). D2 represents the distance between the rod lens 53 and the incident end of the optical fiber 56. The three dimensional position adjustment is carried out in the following manner.

Light of a wavelength that passes the reflection film 55 is let in the film 55 from the side corresponding to the optical fiber 58. In this state, the single core optical fiber chip 71 is three dimensionally moved relative to the center piece 61. The position of the single core optical fiber chip 71 is adjusted such that the intensity of the light that passes the film 55 and radiates from the optical fiber 56 is maximized. At this adjusted positions, the coupling efficiency of the rod lens 53 and the optical fiber 56 is maximized.

The double core optical fiber chip 72 is adjusted in the same manner. That is, the optical axis of the rod lens 54 is three dimensionally adjusted with respect to the ends of the optical fibers 58, 59. D3 represents the distance from the rod lens 54 to the ends of the optical fibers 58, 59. The position adjustment is carried out in the following manner.

Light of a wavelength that is reflected by the reflection film 55 strikes the film 55 from the side corresponding to the optical fiber 58. In this state, the double core optical fiber chip 72 is three dimensionally moved relative to the center piece 61. The position of the double core optical fiber chip 72 is adjusted such that the intensity of the light that is reflected by the film 55 and radiates from the optical fiber 59 is maximized. At this adjusted positions, the coupling efficiency of the first and second rod lenses 53, 54 and the optical fibers 58, 59 is maximized.

To integrate the optical fiber chips 71, 72 with the center piece 61, each of the optical fiber chips 71, 72 is fixed to the center piece 61 with a coupler member (not shown). The distances D1 D2, D3 are arbitrary adjusted in accordance with the pitches of the rod lenses 53, 54.

For example, when a light signal containing mixed light components with center wavelengths within the wavelength ranges λ1, λ2 enters the optical fiber 58, the light component of the center wavelength within the range λ1 passes the wavelength selective reflection film 55. The passed light is condensed by the rod lens 53 and coupled with the optical fiber 56. The remainder of the light, that is, the light component of the center wavelength within the range λ2 is reflected by the reflection film 55. The reflected light is condensed by the rod lens 54 and is coupled with the optical fiber 59. In this manner, an optical signal having the center wavelength within the wavelength range λ1 is separated.

The above configured first embodiment provides the following advantages.

(1) The center piece 61, in which the first and second rod lenses 53, 54 of the optical fiber collimators 51, 52 are coaxially integrated, is formed. The optical fiber chips 71, 72 are aligned with and fixed to the center piece 61, thereby completing the filter module 50. Therefore, the number of the steps needed in the prior art, for example, steps for adjusting positions and steps for fixing positions, is reduced.

That is, a module is manufactured simply by fixing the optical fiber chips 71, 72 to the center piece 61 after aligning the positions. The reduced number of position adjusting steps and position fixing steps shortens the manufacturing time and facilitates the manufacture of modules. As a result, the manufacturing costs are reduced. Therefore, the structure is easily simplified and the manufacture is facilitated. In other words, inexpensive and reliable filter modules are obtained.

(2) All the three members, that is, the center piece 61, the optical fiber chips 71, 72, are aligned and integrated. This improves the manufacture efficiency and further reduces the manufacturing time.

(3) The double core optical fiber chip 72 must be aligned and fixed with exacting tolerance. When adjusting the positions of the three members, the double core optical fiber chip 72 is aligned with respect to and fixed to the center piece 61 prior to aligning and fixing of the single core optical fiber chip 71. This improves the efficiency of the assembly and reduces the manufacturing time. Also, high positioning accuracy is achieved, and the coupling efficiency is improved.

(4) The first and second rod lenses 53, 54 of the same structure are coaxially aligned by simply inserting the rod lenses 53, 54 into the lens holder 62. This facilitates the manufacture of the center piece 61.

(5) The distances D1, D2, D3 are arbitrary adjusted in accordance with the pitches of the first and second rod lenses 53, 54. Therefore, the degree of flexibility in the design of the filter module 50 is increased by changing the pitches.

A filter module 50A according to a second embodiment will now be described with reference to FIG. 2. The filter module 50A includes a center piece 61A. The center piece 61A includes a single core optical fiber chip 71A and a double core optical fiber chip 72A, which are aligned and fixed. First and second rod lenses 53, 54 used in the second embodiment are the same as the first and second rod lenses 53, 54 used in the first embodiment except that the pitch of the rod lenses 53, 54 in the second embodiment is 0.23.

The center piece 61A includes a first cylindrical lens holder 63 for holding the first rod lens 53 and a second cylindrical lens holder 64 for holding the second rod lens 54. The first lens holder 63 has a small diameter hole 63*a*, a large diameter hole 63*b*, and an annular cylindrical portion 63*c*, which are coaxially arranged. The first rod lens 53 is inserted into the small diameter hole 63*a* and fixed with adhesive. The ends of the first lens holder 63 are perpendicular to the axis of the lens holder 63. The second lens holder 64 has a small diameter hole 64*a*, a large diameter hole 64*b*, and a circumferential portion 64*c*, which are coaxially arranged. The circumferential portion 64*c* is fitted to the annular cylindrical portion 63c. The second rod lens 54 is inserted into the small diameter hole 64a and fixed with adhesive. The ends of the second lens holder 64 are perpendicular to the axis of the lens holder 64. The first and second holders 63, 64 are made of metal, such as stainless steel or Kovar.

The center piece 61A is manufactured in the following manner. First, the annular cylindrical portion 63c of the first lens holder 63 is fitted to the circumferential portion 64c of the second lens holder 64. In this state, the distance between the first and second rod lenses 53, 54 is adjusted. Then, the lens holders 63, 64 are integrated. That is, the rod lenses 53, 54 are inserted into the lens holders 63, 64, respectively. Then, the lens holders 63, 64 are engaged with each other to coaxially arranging the first and second rod lenses 53, 54. Thereafter, the annular cylindrical portion 63c of the first lens holder 63 and the circumferential portion 64c of the second lens holder 64 are fixed to each other by welding with YAG laser. The center piece 61A is thus completed.

The optical fiber chips 71A, 72A are aligned with respect to and fixed to the first and second lens holders 63, 64 of the center piece 61A by means of coupler members 69, 70, respectively.

The single core optical fiber chip 71A includes a single core capillary 57 for holding the optical fiber 56 and a tube 65 for holding the capillary 57. Likewise, the double core optical fiber chip 72A includes a double core capillary 60 for holding the optical fibers 58, 59 and a tube 66 for holding the capillary 60.

The capillaries 57, 60 are fitted and fixed to the tubes 65, 66 with adhesive, respectively. The slant ends of the capillaries 57, 60 protrude from the open ends of the tubes 65, 66, respectively. The other ends of the tubes 65, 66 are sealed by end caps 67, 68, respectively. The capillaries 57, 60 are made of glass, such as Pyrex (registered trademark), or a metal, such as zirconia and alumina. The tubes 65, 66 are made of metal, such as stainless steel or Kovar.

The coupler members 69, 70 are cylindrical and each have an end fixed to the end of the corresponding lens holder 63, 64 and a cylindrical portion 69a, 70a to which the capillary 57, 60 is fitted. The coupler members 69, 70 are made of metal, such as stainless steel or Kovar.

All the optical components consisting the optical fiber collimators 51, 52 are sealed with the tubes 65, 66 fixed to the lens holders 63, 64 with the coupler members 69, 70.

The procedure for manufacturing the filter module 50A will now be described with reference to FIGS. 3(a) to 3(d).

Figure 3:
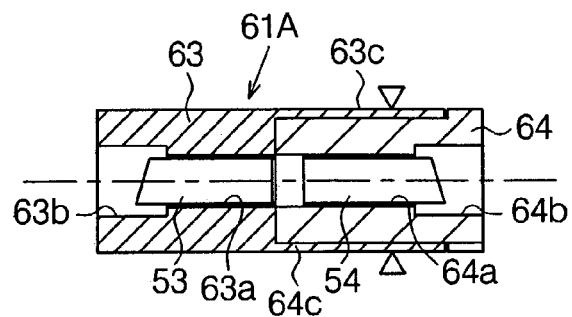
FIGS. 3(a) to 3(d) are diagrams showing a procedure for manufacturing the filter module of FIG. 2.
Figure 3:
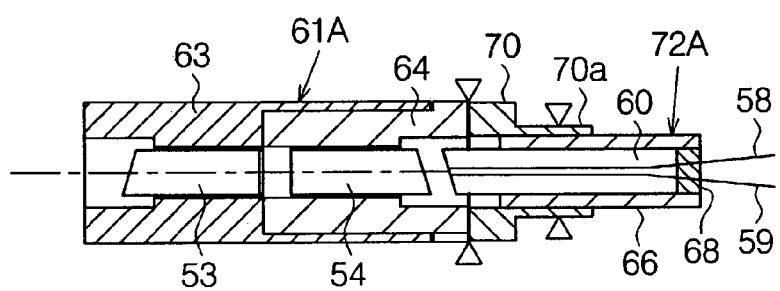
Figure 3:
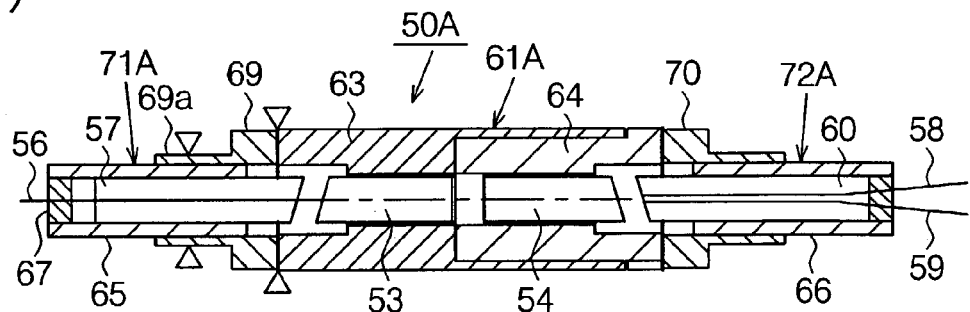
Figure 3:
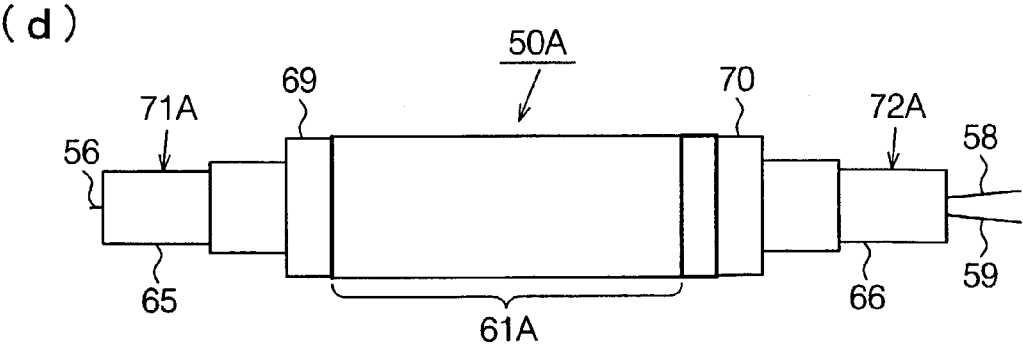

First, as shown in FIG. 3(a), the first rod lens 53 is inserted into the small diameter hole 63a of the first lens holder 63 and fixed with adhesive. The second rod lens 54 is inserted into the small diameter hole 64a of the second rod lens 54 and fixed with adhesive. The adhesive used in this step is a thermosetting adhesive. As the thermosetting adhesive, for example, an epoxy adhesive, such as Epotec 353ND (trade name, product of Epoxy Technology is used).

Then, as shown in FIG. 3(a), the annular cylindrical portion 63c of the first lens holder 63 is fitted to the circumferential portion 64c of the second lens holder 64. In this state, the first and second lens holders 63, 64 are rotated relative to each other about the axes, thereby matching the phases of the slant ends of the first and second rod lenses 53, 54. The first and second lens holders 63, 64 are moved along the Z direction, thereby adjusting the distance between the first and second rod lenses 53, 54. The distance is easily adjusted by placing a spacer (not shown) between the first and second lens holders 63, 64. In this embodiment, the distance between the lenses 53, 54 is substantially 0.25 mm.

Thereafter, the portion indicated by triangles in FIG. 3(a) is welded with YAG laser, thereby fixing the first and second lens holders 63, 64 to each other. The center piece 61A is thus completed.

Then, the positions of the optical fiber chips 71A, 72A are adjusted with respect to the center piece 61A. At this time, as shown in FIG. 3(b), the double core optical fiber chip 72a is three dimensionally moved with respect to the center piece 61A to adjust the position. Then, the double core optical fiber chip 72A is fixed to the center piece 61A. The double core optical fiber chip 72A is fixed to the center piece 61A by welding the coupler member 70 to the second lens holder 64 with YAG laser, and welding the cylindrical portion 70a of the coupler member 70 to the tube 66 with YAG laser. The welded portions are indicated with triangles in FIG. 3(b). Likewise, triangles in other drawings indicate welded portions.

Next, as shown in FIG. 3(c), the single core optical fiber chip 71A is three dimensionally moved with respect to the center piece 61A to adjust the position. Then, the single core optical fiber chip 71A is fixed to the center piece 61A in the same manner as the double core optical fiber 72A. The filter module 50A shown in FIG. 3(d) is thus completed.

In addition to the advantages (1) to (3), and (5), the above configured second embodiment provides the following advantages.

(6) The center piece 61A is manufactured in the following manner. First, the annular cylindrical portion 63c of the first lens holder 63 is fitted to the circumferential portion 64c of the second lens holder 64. In this state, the distance between the rod lenses 53, 54 is adjusted. Then, the lens holders 63, 64 are fixed to each other. Accordingly, the center piece 61A having a high stiffness is obtained, which increases the durability of the filter module 50A.

(7) Since YAG laser is used to fix the first and second lens holders 63, 64, the stiffness of the center piece 61A is further increased. Compared to a case where adhesive is used for fixing the lens holders 63, 64, the use of YAG laser increases the weather resistance, light resistance power characteristics.

(8) The optical fiber chips 71A, 72A are fixed to the lens holders 63, 64 of the center piece 61A by means of the coupler members 69, 70, respectively. This increases the strength of the entire filter module 50A. In other words, the highly durable filter module 50A is obtained.

(9) All the optical components consisting the optical fiber collimators 51, 52 are sealed with the tubes 65, 66 fixed to the lens holders 63, 64 by means of the coupler members 69, 70. Therefore, the optical components are prevented from degrading. The durability is improved, accordingly.

A filter module 50B according to a third embodiment will now be described with reference to FIGS. 4 to 9. The fourth embodiment has the following two features.

1) In the filter module 50B of the third embodiment, the optical fiber chips 71B, 72B are fixed and integrated to the center piece 61B to form the optical fiber collimators 51, 52. The optical fiber collimators 51, 52 are accommodated in a sealed outer tube 74.

Figure 2:
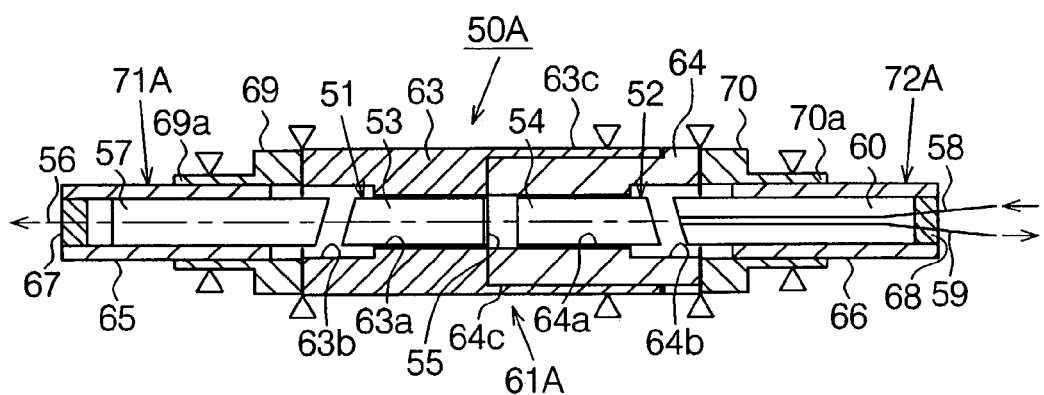
FIG. 2 is a cross-sectional view illustrating a filter module according to a second embodiment.

2) The optical fiber chips 71B, 72B are directly fixed to the rod lenses 53, 54 without using the coupler members 69, 70 (see FIG. 2).

The filter module 50B will now be described focusing on these features. Rod lenses 53, 54 used in this embodiment is the same as those used in the first embodiment except that the pitch is 0.25. Since the pitch is 0.25 and is greater than the pitch of the lenses in the first embodiment, or 0.245, a wavelength selective reflection film 55 is formed on the left end of the rod lens 54 (see FIGS. 5(a), 5(b)).

Figure 4:
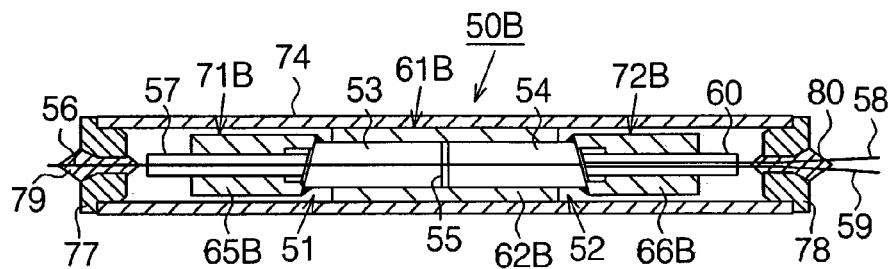
FIG. 4 is a cross-sectional view illustrating a filter module according to a third embodiment.
Figure 5:
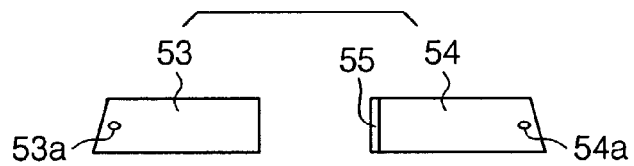
FIGS. 5(a) and 5(b) are diagrams showing a procedure for manufacturing the filter module of FIG. 4.
Figure 5:
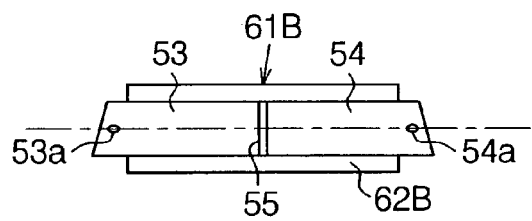
Figure 6:
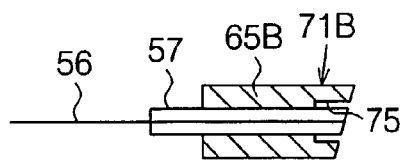
FIGS. 6(a) and 6(b) are diagrams showing steps subsequent to the steps of FIGS. 5(a) and 5(b)
Figure 6:
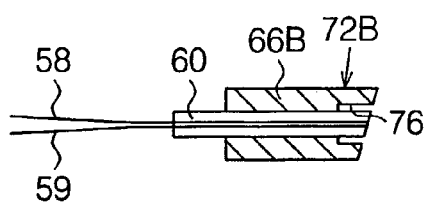
Figure 7:
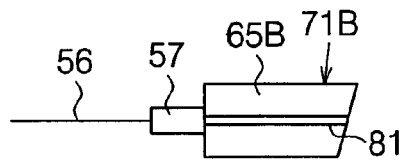
FIGS. 7(a) and 7(b) are diagrams showing steps subsequent to the steps of FIGS. 6(a) and 6(b)
Figure 7:
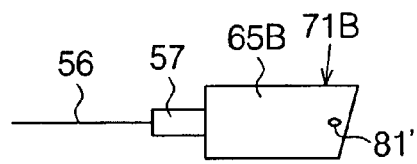
Figure 8:
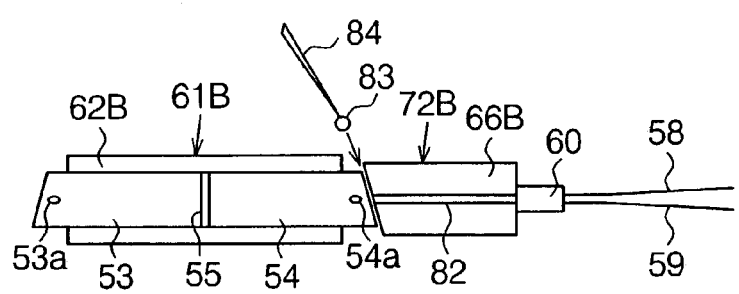
FIGS. 8(a) to 8(c) are diagrams showing steps subsequent to the steps of FIGS. 7(a) and 7(b)
Figure 8:
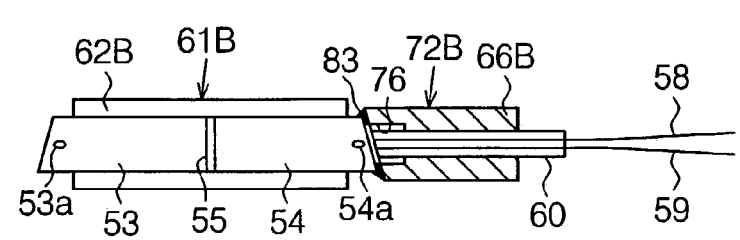
Figure 8:
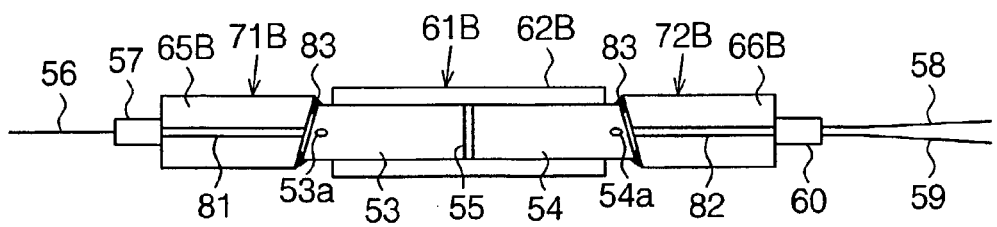
Figure 9:
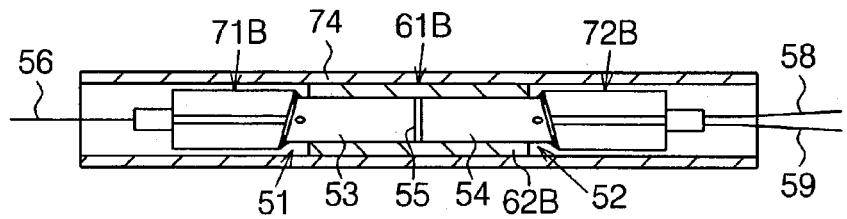
FIGS. 9(a) to 9(c) are diagrams showing steps subsequent to the steps of FIGS. 9(a) to 9(c)
Figure 9:
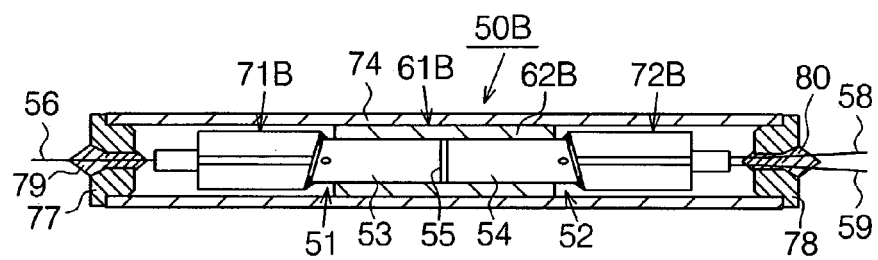
Figure 9:
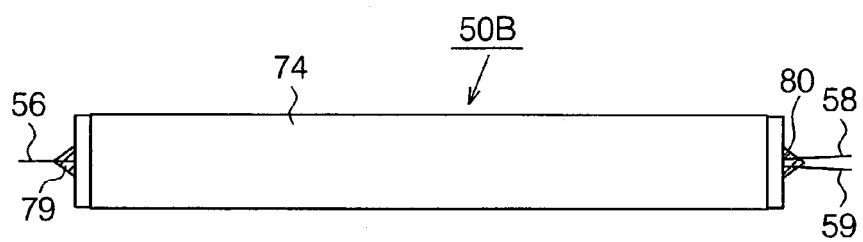

As shown in FIG. 4, the filter module 50B includes a center piece 61B. A single core optical fiber chip 71B and a double core optical fiber chip 72B are aligned with and fixed to the center piece 61B.

In the center piece 61B, first and second rod lenses 53, 54 are inserted to and fixed to a lens holder 62B with adhesive. The ends of the first and second rod lenses 53, 54 are engaged with a wavelength selective reflection film 55. The center piece 61B is thus integrated. A lens holder 62B is fitted in and fixed to an outer tube 74 with adhesive. The lens holder 62B coaxially holds the first and second rod lenses 53, 54. The lens holder 62B and the outer tube 74 are made of a material having a low coefficient of thermal expansion, such as glass, particularly Pyrex (registered trademark). Alternatively, the lens holder 62B and the outer tube 74 are made of metal such as stainless steel and Kovar.

The single core optical fiber chip 71B includes a single core capillary 57 for holding the optical fiber 56 and a cylindrical capillary holder 65B for holding the capillary 57. The right end of the capillary holder 65B, which corresponds to the rod lens, is ground to be in the same angle as the rod lens 53. The single core capillary 57 is fixed to the capillary holder 65B with adhesive such that the slant end does not protrude toward the rod lens from the slant end of the capillary holder 65B.

The slant end of the capillary holder 65B is fixed to the left end of the rod lens 53 with adhesive. A recess 75 is formed in the capillary holder 65B between the right end of the capillary holder 65B and the capillary 57 such that the adhesive does not enter the optical path between the optical fiber 56 and the rod lens 53 (see FIG. 6(a)).

The double core optical fiber chip 72B has the similar structure as the single core optical fiber chip 71B. A recess 76 is formed in the capillary holder 66B at one end (the left end as viewed in FIG. 4, the right end as viewed in FIG. 6(b)) between the capillary holder 66B and the capillary 60. The capillaries 57, 60 are made of a glass material having a low coefficient of thermal expansion or ceramics such as zirconia and alumina. Alternatively, the capillaries 57, 60 are may be made of metal. The capillary holders 65B, 66B are made of metal, such as stainless steel or Kovar.

Metal or plastic end caps 77, 78 are attached to the open ends of the outer tube 75, respectively. A through hole is formed in the left end cap 77. A holding member 79 through which the optical fiber 56 extends is fitted in the through hole. Likewise, a through hole is formed in the right end cap 78. A holding member 80 through which the optical fibers 58, 59 extend is fitted in the through hole. The end caps 77, 78, to which the holding members 79, 80 are fitted, are attached to the ends of the outer tube 74, respectively. This seals the outer tube 74 with the optical fiber collimators 51, 52 accommodated therein.

The procedure for manufacturing the filter module 50B will now be described with reference to FIGS. 5(a), 5(b), 6(a), 6(b), 7(a), 7(b), 8(a), 8(b), 8(c), 9(a), and 9(b).

First as shown in FIG. 5(a), the first and second rod lenses 53, 54 with reference marks 53a, 54a are prepared. The reference marks 53a, 54a are used to match the phases of the slant ends.

Then, the first and second rod lenses 53, 54 are inserted into the lens holder 62B until the facing ends engage with the reflection film 55 in between as shown in FIG. 5(b). At this time, the reference marks 53a, 54a are aligned to match the phases of the slant ends of the first and second rod lenses 53, 54. Thereafter, the first and second rod lenses 53, 54 are fixed to the lens holder 62B with an ultraviolet curing adhesive or a thermal setting adhesive. The center piece 61B is thus completed.

Then, as shown in FIG. 6(a), the single core capillary 57 is inserted into the capillary holder 65B to a predetermined position and fixed to the capillary holder 65B with adhesive. The single core optical fiber chip 71B is thus manufactured. In the same manner, the double core optical fiber chip 72B is manufactured (see FIG. 6(b)). Reference lines 81, 82 for matching the phases of the slant ends are provide on the circumference of the capillary holders 65B, 66B, respectively (see FIGS. 7(a) and 8(a)).

Then, as shown in FIG. 8(a), the reference mark 54a of the rod lens 54 is aligned with the reference line 82 of the capillary holder 66B. In this state, the double core optical fiber chip 72B is three dimensionally adjusted with respect to the rod lens 54 as in the second embodiment. In this state, optical adhesive 83 (such as a thermosetting epoxy adhesive) is applied to the space between the rod lens 54 and the capillary 66B to fix the double core optical fiber chip 72B to the rod lens 54. When applying the optical adhesive 83, a micro spatula 84 is used. That is, a tiny amount of adhesive 83 is scooped with the micro spatula 84 and then applied to the space. Since the space between the members 54, 66B is several tens of μm, dropping the optical adhesive 83 causes a capillary phenomenon, which permits the adhesive 83 to penetrate toward the center of the capillary holder 66B.

Accordingly, the optical adhesive 83 enters the recess 76. This prevents the optical adhesive 83 from interfering with the optical path in the rod lens 54. FIGS. 8(b) and 8(c) show a state in which the optical adhesive 83 has penetrated into the entire space and annularly arranged.

Then, as shown in FIG. 8(c), the capillary holder 65B is fixed to the rod lens 53 with the optical adhesive 83 in the same manner as the capillary holder 66B, thereby fixing the single core optical fiber chip 71B to the rod lens 53. The integrated optical fiber collimators 51, 52 are thus completed.

Thereafter, as shown in FIG. 9(a), the integrated optical fiber collimators 51, 52 are accommodated in the outer tube 74. As shown in FIGS. 9(b), 9(c), the end caps 77, 78 are attached to the open ends of the outer tube 74, respectively. The filter module 50B is thus completed.

In addition to the advantages (1) to (3), and (5), the above configured third embodiment provides the following advantages.

(10) In the filter module 50B, the integrated optical fiber collimators 51, 52 are accommodated in the sealed outer tube 74. Therefore, the optical components are prevented from being degraded. The durability of the filter module 50B is thus improved. Also, the outer tube 74 protects the optical components of the optical fiber collimators 51, 52.

(11) The lens holder 62B is fitted in and fixed to the outer tube 74 with adhesive and holds the first and second rod lenses 53, 54. This prevents vibration in the outer tube 74 and improves the durability.

(12) The optical fiber chips 71B, 72B of the capillary holders 65B, 66B are directly fixed to the first and second rod lenses 53, 54 without using the coupler members 69, 70 (FIG. 2). Therefore, the number of parts is reduced, which further reduces the manufacturing cost.

(13) The recesses 75, 76 are formed in the ends of the capillary holders 65B, 66B, respectively. Therefore, when coupling the capillary holders 65B, 66B to the first and second rod lenses 53, 54, the optical adhesive 83 is prevented from interfering the optical path of the rod lenses.

A filter module 50C according to a fourth embodiment will now be described with reference to FIGS. 10, 11(a) to 11(f), 12(a) to 12(e), and 13(a) to 13(d). The fourth embodiment has the following two features.

Figure 10:
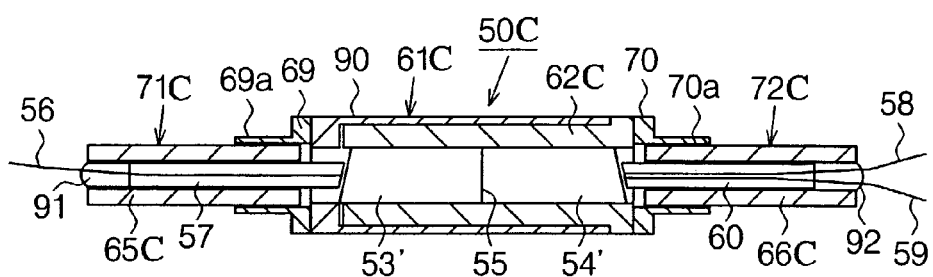
FIG. 10 is a cross-sectional view illustrating a filter module according to a fourth embodiment.
Figure 11:
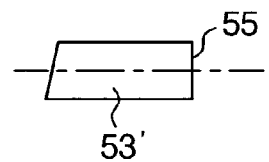
FIGS. 11(a) to 11(f) are diagrams showing components of the filter module shown in FIG. 10.
Figure 11:
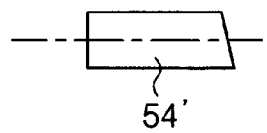
Figure 11:
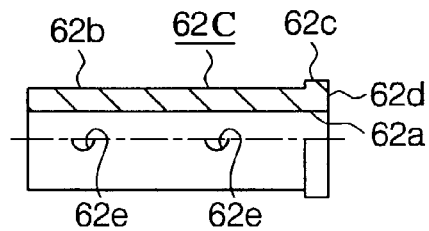
Figure 11:
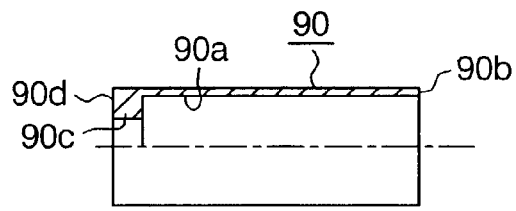
Figure 11:
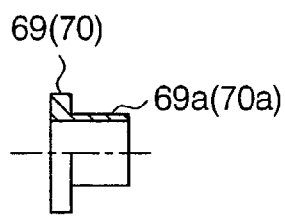
Figure 11:
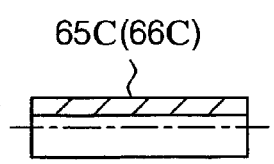

1) Instead of the first and second rod lenses 53, 54, rod lenses 53', 54' having metal-plated outer circumference are used (see FIGS. 10, 11(a), and 11(b)). The center piece 61C has a cylindrical lens holder 62C with an Ni—Au plated inner circumference 62a for receiving the rod lenses 53', 54' (see FIGS. 10 and 11(c)). The rod lenses 53', 54' are inserted into the lens holder 62C. Then, the outer surfaces of the rod lenses 53', 54' and the inner circumference 62a of the lens holder 62C are soldered to each other.

2) The center piece 61C includes an outer tube 90 that is fitted about and fixed to the outer surface of the lens holder 62C (see FIGS. 10 and 11(d)).

The filter module 50C will now be described focusing on these features. The pitch of the rod lenses 53', 54' of this embodiment is 0.245. A wavelength selective reflection film 55 is formed on an end of the first rod lens 53' (see FIG. 11(a)).

As shown in FIG. 11(c), the lens holder 62C is a cylindrical tube and is made of the same material as the lens holder 62. The inner circumference 62a of the lens holder 62C is accurately machined to coaxially hold the rod lenses 53', 54'. The outer circumference 62b of the lens holder 62C is machined to be accurately fit with the inner circumference 90a of the outer tube 90. An annular projection 62c is formed on the circumference of a first end of the lens holder 62C. The annular projection 62c contacts a first open end 90b of the outer tube 90. A first end 62d of the lens holder 62C, which is located in the vicinity of the projection 62c, engages with the end of the coupler member 70 (see FIG. 11(e)). The lens holder 62C has necessary number of solder holes 62e, each extending through the outer wall of the lens holder 62C.

As shown in FIG. 11(d), the outer tube 90 is a cylindrical tube and is made of the same material as the lens holder 62C. The inner circumference 90a of the outer tube 90 is machined to be accurately fit with the outer circumference 62b of the lens holder 62C. A projection 90c is formed at a second open end of the outer tube 90. The projection 90c projects toward the center. The second end 90d of the outer tube 90 engages with the end of the coupler member 69 (see FIG. 11(e)).

Figure 12:
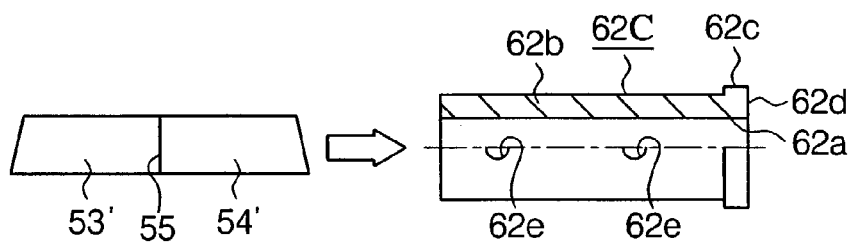
FIGS. 12(a) to 12(e) are diagrams showing a procedure for manufacturing the filter module of FIG. 10.
Figure 12:
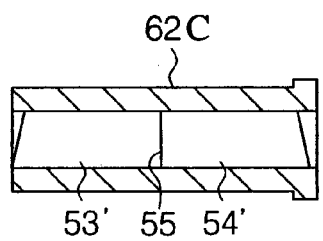
Figure 12:
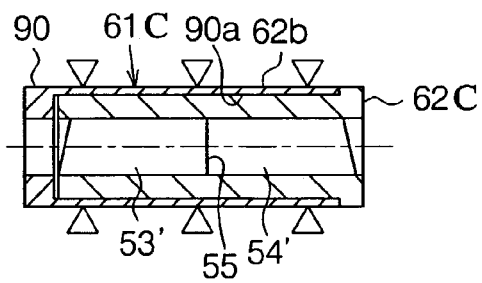
Figure 12:
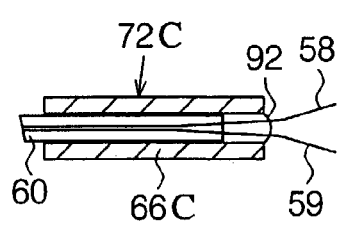
Figure 12:
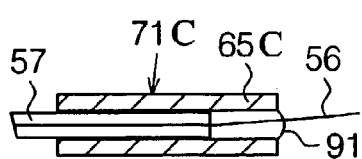

The single core optical fiber chip 71C includes a single core capillary 57 and a cylindrical capillary holder 65C for holding the capillary 57. The ends of the capillary holder 65C are flat. The single core capillary 57 is press fitted to the inner circumference of the capillary holder 65C shown in FIG. 11(f). As shown in FIG. 12(e), the single core capillary 57 is press fitted in the capillary holder 65C such that the slant end protrudes from the left open end of the capillary holder 65C and the flat end is buried in the right open end. The space created in the capillary holder 65C is filled with a backfill resin 91 (see FIG. 12(e)).

The double core optical fiber chip 72C has the similar structure as the single core optical fiber chip 71C. As shown in FIG. 12(d), the space created in the capillary holder 66C is also filled with a backfill resin 92.

The procedure for manufacturing the filter module 50C will now be described with reference to FIGS. 12(a) to 12(e), and 13(a) to 13(d).

First, as shown in FIG. 12(a), the rod lenses 53', 54' are inserted in the lens holder 62C with the phases of the slant ends matched.

The lens holder 62C is placed in an atmosphere of a temperature equal to or less than 250 degrees (for example, in an oven), and Sn based solder is poured through the solder holes 62e of the lens holder 62C, thereby fixing the rod lenses 53', 54' and the lens holder 62C.

Then, as shown in FIG. 12(c), the inner circumference 90a of the outer tube 90 is fitted about the outer circumference 62b of the lens holder 62C. The lens holder 62C and the outer tube 90 are fixed to each other by welding with YAG laser. The center piece 61C with the coaxial rod lenses 53', 54' is thus completed.

Next, the double core optical fiber chip 72C shown in FIG. 12(d) and the single core optical fiber chip 71C shown in FIG. 12(e) are prepared. The capillaries 57, 60 are manufactured with zirconia ceramics so that the capillaries 57, 60 can be press fitted into the capillary holders 65C, 66C.

Then, as shown in FIG. 13(a), the position of the double core optical fiber chip 72C is three dimensionally adjusted with respect to the rod lens 54'. The double core optical fiber chip 72C thus adjusted is held by an appropriate jig at positions indicated by arrows in FIG. 13(a).

In this state, three members, or the lens holder 62C, the coupler member 70, and the capillary holder 66C, are integrated by welding with YAG laser.

Then, as shown in FIG. 13(c), the position of the single core optical fiber chip 71C is three dimensionally adjusted with respect to the rod lens 53'. The single core optical fiber chip 71C thus adjusted is held by a jig as described above. In this state, three members, or the outer tube 90, the coupler member 69, and the capillary holder 65C, are integrated by welding with YAG laser. The filter module 50C is thus completed (see FIG. 13(d)).

In addition to the advantages (1) to (3), and (5), the above configured fourth embodiment provides the following advantages.

(14) The rod lenses 53', 54' having metal-plated outer circumference are used. The inner circumference 62a of the lens holder 62C is plated with Ni—Au. The outer circumference of the rod lens 53', 54' and the inner circumference 62a of the lens holder 62C are fixed to each other by soldering. This improves the stiffness of the center piece 61C and therefore improves the reliability of the filter module 50C.

(15) The center piece 61C includes the outer tube 90 that is fitted about and fixed to the outer circumference of the lens holder 62C. This further improves the stiffness of the center piece 61C and therefore improves the reliability of the filter module 50C.

It should be apparent to those skilled in the art that the present invention may be embodied in many other specific forms without departing from the spirit or scope of the invention. Particularly, it should be understood that the invention may be embodied in the following forms.

In the first, third, and fourth embodiments, the two rod lenses may be replaced by two convex lenses. In this case, the convex lenses are arranged coaxially and integrated to form the center piece.

In the third embodiment, the reference lines 81, 82 on the outer circumference of the capillary holders 65B, 66B may be replaced with notches or reference mark 81' as shown in FIG. 7(b).

The procedure for matching the phases of the slant ends of the first and second rod lenses 53, 54 described in the second embodiment may be applied to any other embodiments.

Therefore, the present examples and embodiments are to be considered as illustrative and not restrictive and the invention is not to be limited to the details given herein, but may be modified within the scope and equivalence of the appended claims.

The invention claimed is:

1. A filter module including a first optical fiber collimator, a second optical fiber collimator, and a filter located between the first and second optical fiber collimators:
   wherein the first optical fiber collimator includes a first optical fiber, a first optical fiber chip for holding the first optical fiber, and a first lens;
   wherein the second optical fiber collimator includes a second optical fiber, a second optical fiber chip for holding the second optical fiber, and a second lens;
   wherein the filter is located between and coaxial with the first and second lenses, and the filter, the first lens, and the second lens form a center piece of the filter module, in which the center piece holds the optical axes of facing lenses and the filter such that the optical axes are aligned, the facing lenses being the first and the second lenses, and the center piece being integrally formed of the filter and the facing lenses;
   wherein each of the first and second optical fiber chips includes a capillary for holding the corresponding optical fiber and a cylindrical capillary holder for holding the capillary, and wherein each capillary holder is adhered to the corresponding lens with adhesive; and
   wherein each capillary holder is provide with a recess, the recess being located between the capillary holder and the corresponding capillary, and the recess facing the corresponding lens.

2. The filter module according to claim 1, wherein the first and second lenses are gradient index rod lenses.

3. The filter module according to claim 2, wherein the filter is formed on the end face of one of the first and second lenses.

4. The filter module according to claim 2, wherein the first and second lenses each have an optical axis and a slant end, the slant end being inclined relative to the optical axis by a predetermined angle, and wherein each of the first and second lenses is provided with a mark used for matching the phases of the slant ends.

5. The filter module according to claim 4, wherein each of the first and second optical fiber chips is provided with a mark used for aligning the position relative to the corresponding lens.

6. The filter module according to claim 1, wherein the first and second optical fiber chips are fixed to the center piece in a state where the positions of the first and second optical fiber chips are adjusted relative to the center piece.

7. The filter module according to claim 1, wherein the first optical fiber comprises a single optical fiber, and wherein the second optical fiber comprises two optical fibers.

8. The filter module according to claim 7, wherein the ends of the first and second optical fibers are ground to have the same inclined angles as those of the slant ends of the first and second lenses.

9. The filter module according to claim 1, wherein the center piece includes a lens holder that is a cylindrical tube for holding the filter and the facing lenses.

10. The filter module according to claim 1, further comprising an outer tube for accommodating the first and second optical fiber collimators in a sealed state.

11. The filter module according to claim 10, wherein the lens holder is fitted to and fixed to the outer tube.

12. The filter module according to claim 1, wherein the first and second lenses are gradient index rod lenses each having a metal-plated outer circumference, wherein the center piece includes a cylindrical lens holder having a plated inner circumference, and wherein the first and second lenses are inserted into and soldered to the lens holder.

13. The filter module according to claim 12, wherein the center piece includes an outer tube, the outer tube being fitted to and fixed to the outer circumference of the lens holder.

14. A filter module including a first optical fiber collimator, a second optical fiber collimator, and a filter located between the first and second optical fiber collimators:
   wherein the first optical fiber collimator includes a first optical fiber, a first optical fiber chip for holding the first optical fiber, and a first rod lens;
   wherein the second optical fiber collimator includes a second optical fiber, a second optical fiber chip for holding the second optical fiber, and a second rod lens;
   wherein the filter is located between and coaxial with the first and second rod lenses and is fixed to the second rod lens, and the filter, the first rod lens, and the second rod lens form a center piece of the filter module, in which the center piece holds the optical axes of facing lenses and the filter such that the optical axes are aligned, the facing lenses being the first and the second lenses, and the center piece being integrally formed of the filter and the facing lenses; and the first and second rod lenses each have an optical axis and a slant end, the slant end being inclined relative to the optical axis by a predetermined angle, and each of the first and second rod lenses being provided with a mark used for matching the phases of the slant ends; and the first optical fiber comprises a single optical fiber, and the second optical fiber comprises two optical fibers;
   wherein each of the first and second optical fiber chips includes a capillary for holding the corresponding optical fiber and a cylindrical capillary holder for holding the capillary, and wherein each capillary holder is adhered to the corresponding lens with adhesive; and
   wherein each capillary holder is provide with a recess, the recess being located between the capillary holder and the corresponding capillary, and the recess facing the slant end of the corresponding lens.

* * * * *